United States Patent [19]
Bernady et al.

[11] 3,897,483
[45] July 29, 1975

[54] NOVEL 1-ACYLOXY-2-(OMEGA-CARBOALKOXYALKYL)CYCLOALK-1-ENES

[75] Inventors: Karel Francis Bernady; Middleton Brawner Floyd, Jr., both of Suffern; John Frank Poletto, Nanuet, all of N.Y.; Robert Eugene Schaub, Upper Saddle River; Martin Joseph Weiss, Oradell, both of N.J.

[73] Assignee: American Cyanamid Company, Stamford, Conn.

[22] Filed: Jan. 7, 1971

[21] Appl. No.: 104,761

[52] U.S. Cl.... 260/488 R; 260/410.9 R; 260/468 D; 260/468 K; 260/491; 260/514 D; 260/514 K; 424/305; 424/317
[51] Int. Cl.................. C07c 69/14; C07c 69/24

[58] Field of Search...... 260/468 D, 410.9 R, 488 R

[56] References Cited
UNITED STATES PATENTS
3,558,682   1/1971   Pappo et al.............. 260/468 D OTHER PUBLICATIONS
Chem. Abstracts, 45:3329e.
Chem. Abstracts, 46:3209b.

Primary Examiner—Vivian Garner
Attorney, Agent, or Firm—Edward A. Conroy, Jr.

[57] ABSTRACT

This disclosure describes compounds of the class of 1-acyloxy-2-(ω-carboalkoxyalkyl)cycloalk-1-enes useful as intermediates for the preparation of homologues and congeners of 9-oxo-13-trans-prostenoic acid and lower alkyl esters thereof having prostaglandin-like hypotensive activity.

3 Claims, No Drawings

NOVEL 1-ACYLOXY-2-(OMEGA-CARBOALKOXYALKYL)CYCLOALK-1-ENES

BRIEF SUMMARY OF THE INVENTION

This invention relates to new organic compounds and, more particularly, is concerned with novel 1-acyloxy-2-(ω-carboalkoxyalkyl)cycloalk-1-enes which may be represented by the following general formula:

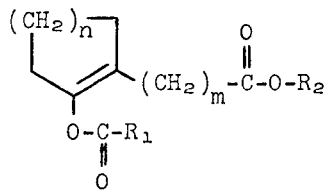

wherein $n$ is the integer 1 or 2; $m$ is an integer from 1 to 8, inclusive; and $R_1$ and $R_2$ are lower alkyl groups which may be the same or different. Suitable lower alkyl groups contemplated by the present invention are those having up to four carbon atoms such as, for example, methyl, ethyl, isopropyl, sec-butyl, etc.

DETAILED DESCRIPTION OF THE INVENTION

The novel 1-acyloxy-2-(ω-carboalkoxyalkyl)cycloalk-1-enes of the present invention are obtainable as yellow oils having characteristic boiling points and absorption spectra. They are relatively insoluble in water but are soluble in common organic solvents such as ethanol, ethyl acetate, dimethylformamide, and the like.

The novel compounds of the present invention may be readily prepared from an appropriate 2-(ω-carboalkoxyalkyl)cycloalkanone as follows:

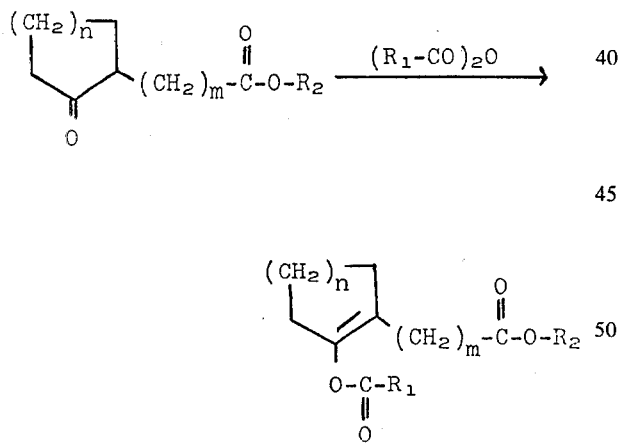

wherein $R_1$, $R_2$, $m$ and $n$ are as hereinabove defined. This conversion of the cycloalkanone to the enol acylate is effected by heating with an alkanoic acid anhydride [$(R_1\text{-CO})_2O$] such as propionic anhydride, isobutyric anhydride, n-valeric anhydride, etc. in the presence of an acid catalyst. In practice, we have found acetic anhydride and p-toluenesulfonic acid to be preferred reagents for this purpose. Preparation of the enol acylate usually requires heating for a period of from about eight to thirty-six hours. During this period it is preferable to allow by-product alkanoic acid [$R_1\text{-}CO_2H$] to distill out in order to force the reaction to completion.

The 2-(ω-carboalkoxyalkyl)cycloalkanone starting materials may be readily prepared by first converting 2-carbethoxycyclopentanone or 2-carbethoxycyclohexanone to the sodium enolates thereof by means of sodium hydride in dimethoxyethane and then treating the sodium enolate with an ethyl ω-haloalkanoate of the formula: $X\text{—}(CH_2)_m\text{—}CO_2C_2H_5$ wherein X is iodo or bromo and m is as hereinabove defined. There is thus obtained the corresponding 2-carbethoxy-2-(ω-carbethoxyalkyl)cycloalkanone which is then hydrolyzed and decarboxylated to afford the 2-(ω-carboxyalkyl)cycloalkanone. This acid is then esterified with an alkanol [$R_2OH$] whereby the 2-(ω-carboalkoxyalkyl)cycloalkanone starting materials are obtained. The reaction conditions for carrying out the above sequence of reactions are well known in the art.

The novel compounds of the present invention are useful intermediates for the preparation of classes of compounds (V) and (VI) having hypotensive activity as set forth in the following reaction scheme:

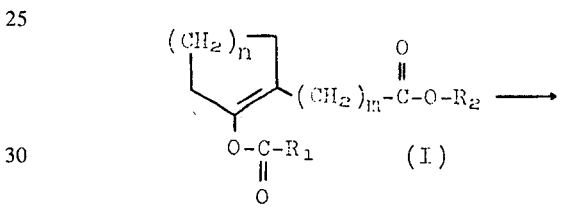

(I)

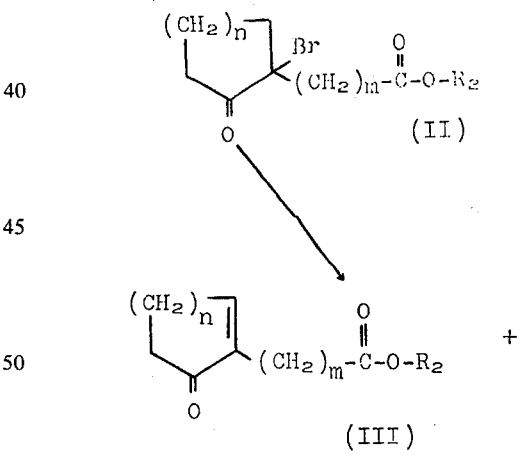

(II)

(III)

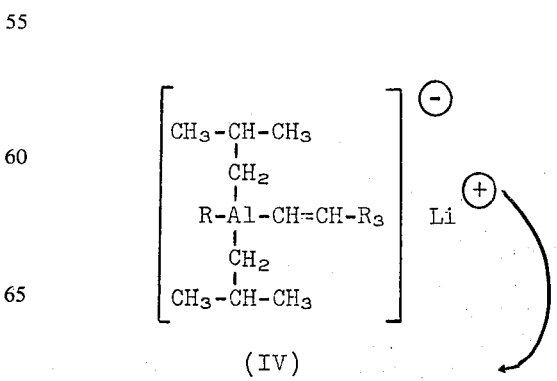

(IV)

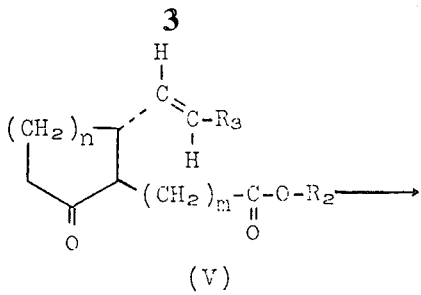

(V)

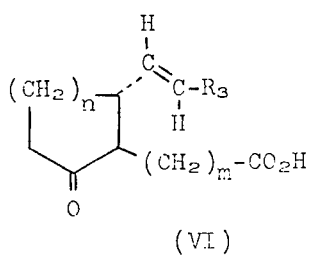

(VI)

wherein R is methyl or n-butyl; $R_3$ is an alkyl group having from 3 to 10 carbon atoms, inclusive; and $R_1$, $R_2$, m, and n are as hereinabove defined. The bromination of the enol acylates (I) to the 2-bromocycloalkanones (II) is preferably carried out in a two phase system as follows. A solution of bromine in chloroform is added to a rapidly stirred mixture of a solution of the enol acylate (I) in chloroform and an aqueous solution of an acid acceptor such as calcium carbonate or soda ash. This addition is carried out at 0°–5°C. over a period of about half an hour, stirring is continued for an additional period of about half an hour to a few hours, and the product (II) is then isolated by standard procedures. The dehydrobromination of the 2-bromocycloalkanones (II) is preferably carried out in dimethylformamide with a mixture of lithium bromide and lithium carbonate at the reflux temperature for a period of about 30 minutes to an hour or so. The so formed cycloalk-2-en-1-ones (III) are also isolated by standard procedures well known in the art.

The hypotensive compounds (V) and (VI) are readily prepared by the conjugate 1,4-addition of an alanate salt (IV) to a 2-(ω-carboalkoxyalkyl)cycloalk-2-en-1-one (III). The yields for this operation are usually high and a clean product, uncontaminated with 1,2-addition product, is usually obtained. Furthermore, the transfer of the alkene group is effected with retention of the trans-configuration, and no reaction is noted at the carboalkoxy function of (III). Another noteworthy aspect of this reaction is that it does not require a catalyst. The alanate salts (IV) are conveniently prepared by the reaction of a 1-alkyne [$R_3$-C≡CH] such as 1-hexyne, 1-decyne, 1-hendecyne, etc. with diisobutylaluminum hydride, followed by reaction with methyl lithium or n-butyl lithium. The reaction of the 1-alkyne with diisobutylaluminum hydride cleanly provides the trans-double bond and is preferably carried out in an inert solvent such as benzene, toluene, and the like at temperatures in the range of 40°–60°C. for several hours. The solvent is removed in vacuo and the subsequent reaction with methyl or n-butyl lithium is preferably carried out in an ether-type solvent such as diethyl ether, dibutyl ether, tetrahydrofuran, and the like. This reaction is rapid and is preferably carried out at 0°–10°C. with cooling. The conjugate 1,4-addition of the alanate salt (IV) to the cycloalk-2-en-1-one (III) is preferably carried out at ambient temperatures for a period of 12 to 24 hours. This reaction is also best carried out in an ether-type solvent such as diethyl ether, dibutyl ether, tetrahydrofuran, and the like. The intermediate alanate-enolate adduct is then hydrolyzed in situ with dilute hydrochloric acid with cooling, and the products (V) are isolated in the usual manner well known in the art. The conversion of the esters (V) to the acids (VI) is readily accomplished by mild saponification procedures such as in 0.5N aqueous-methanolic KOH at room temperature for 20–48 hours.

The homologues and congeners of 9-oxo-13-trans-prostenoic acid (VI) and lower alkyl esters thereof (V) thus prepared are useful as hypotensive agents and their hypotensive activity was demonstrated in the following test procedure. This procedure is a modification of the technique described by Pike et al., *Prostaglandins, Nobel Symposium* 2, Stockholm, June, 1966; p. 165.

Male Wistar strain rats (Royal Hart Farms) averaging approximately 250 grams in weight were fastened to rat boards in a supine position by means of canvas vests and limb ties. The femoral area was infiltrated subcutaneously with lidocaine and the iliac artery and vein were exposed and cannulated. Arterial blood pressure (systolic/diastolic) was recorded using a Statham $P_{23}$ Db pressure transducer-Offner dynograph system. To obtain a stable blood pressure, the animals were anesthetized before use with pentobarbital, 30 mg./kg. of body weight intravenously, and also were given hexamethonium bitartrate, 2 mg./kg. of body weight intravenously. The test compounds were prepared by ultrasonic dispersion in a saline-Tween 80 vehicle. A constant intravenous dose volume of 0.5 ml. was administered and test doses ranged from 0.1 to 10.0 mg./kg. of body weight. Increasing or decreasing doses were selected depending on the dose response obtained. In Table I below are set forth the minimal doses required to produce a decrease of about 10 mm. in diastolic blood pressure for typical acids (VI) and esters (V) prepared from the novel compounds of the present invention.

TABLE I

| Compound | Minimal Effective Dose (mg./kg. of body weight) |
|---|---|
| n-butyl 9-oxo-13-trans-prostenoate | 2 |
| 9-oxo-3,4,5,6,7-pentanor-13-trans-prostenoic acid | 2 |
| 9-oxo-6,7-dinor-13-trans-prostenoic acid | 2 |
| ethyl 9-oxo-3,4,5,6,7-pentanor-13-trans-prostenoate | 8 |
| 9-oxo-10a-homo-13-trans-prostenoic acid | 0.2 |
| 9-oxo-13-trans-prostenoic acid | 0.4 |
| ethyl 20-butyl-9-oxo-13-trans-prostenoate | 10 |
| ethyl 17-methyl-9-oxo-19,20-dinor-13-trans-prostenoate | 10 |
| 9-oxo-20-nor-13-trans-prostenoic | 0.5–1.0 |

TABLE I-Continued

| Compound | Minimal Effective Dose (mg./kg. of body weight) |
|---|---|
| acid 20-methyl-9-oxo-13-trans-prostenoic acid | 0.5–2.0 |
| ethyl 20-methyl-9-oxo-13-trans-prostenoate | 0.5 |
| ethyl 9-oxo-20-nor-13-trans-prostenoate | 0.6 |
| 17-methyl-9-oxo-19,20-dinor-13-trans-prostenoic acid | 0.5 |
| ethyl 9-oxo-13-trans-prostenoate | 0.5 |

The homologues and congeners of 9-oxo-13-trans-prostenoic acid (VI) and lower alkyl esters thereof (V) preparable from the novel compounds of the present invention (I) are also useful as antimicrobial agents. They possess antibacterial and antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. A second set of agar dilutions is prepared identical to the first except that the nutrient agar is designed to support the growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria and yeast-like fugi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial or fungal growth is noted. The minimal inhibitory concentration (expressed in micrograms per milliliter) is defined as the concentration of test compound causing complete inhibition of growth of any particular organism.

In a representative operation, and merely by way of illustration, the minimal inhibitory concentration of typical acids (VI) and esters (V) against a variety of test organisms as determined in the above-described assay are set forth in Table II below:

TABLE II

| Compound | Minimal inhibitory conc. (meg./ml.) | | | | |
|---|---|---|---|---|---|
| | (1) | (2) | (3) | (4) | (5) |
| 9-oxo-18,19,20-trinor-13-trans-prostenoic acid | 250 | 250 | 250 | | 250 |
| ethyl 9-oxo-18,19,20-trinor-13-trans-prostenoate | | | 250 | 250 | |
| ethyl 15-methyl-9-oxo-17,18,19,20-tetranor-13-trans-prostenoate | 250 | 250 | 250 | 62 | |
| 20-butyl-9-oxo-13-trans-prostenoic acid | | 250 | | 10 | 10 |
| ethyl 9-oxo-6,7-dinor-13-trans-prostenoate | | | | 250 | |
| ethyl 9-oxo-3,4,5,6,7-pentanor-13-trans-prostenoate | | 250 | 125 | 125 | 125 |

(1) *Microsporum gypseum* ATCC 14683
(2) *Trichophyton tonsurans* NIH 662
(3) *Trichophyton mentagrophytes* E 11
(4) *Mycobacterium smegmatis* ATCC 606
(5) *Streptococcus pyogenes* C 203

The invention will be described in greater detail in conjunction with the following specific examples.

EXAMPLE 1

Preparation of 2-carboalkoxy(methyl/ethyl)-2-(4-carbethoxybutyl)-cyclopentan-1-one To a stirred solution of the sodium cyclopentanone carboxylate enolate in dimethoxyethane, prepared from 187 g. (1.248 moles) of 2-cyclopentanone carboxylate (mixed methyl and ethyl esters), 52.4 g. (1.248 moles) sodium hydride (57.2% in mineral oil) and 1.6 l. of dimethoxyethane, is added dropwise 309 g. (1.212 moles) of ethyl 5-iodovalerate. The reaction mixture is stirred and heated at reflux for 18 hours. The mixture is cooled and filtered. The solvent is removed from the filtrate by evaporation and the residue is poured into dilute hydrochloric acid and extracted with ether. The combined extracts are washed with water and saline, dried over magnesium sulfate and evaporated to give an oil. The oil is distilled under reduced pressure to give 274 g. of a light yellow oil, b.p. 140°–143°C. (0.17 mm).

EXAMPLE 2

Preparation of 2-(4-carboxybutyl)cyclopentan-1-one

A stirred mixture of 274 g. of 2-carboalkoxy(mixed methyl and ethyl esters)-2-(4-carbethoxybutyl)cyclopentan-1-one (Example 1), 600 ml. of 20% hydrochloric acid and 325 ml. of acetic acid is heated at reflux for 20 hours. Solution occurs in approximately one-half hour. The solution is cooled and diluted with water and extracted with ether. The combined extracts are washed with saline and dried over magnesium sulfate and evaporated. The residue is evaporated twice with toluene to give 144 g. of an oil.

EXAMPLE 3

Preparation of 2-(4-carbethoxybutyl)cyclopentan-1-one

A stirred solution of 124 g. (0.673 mole) of 2-(4-carboxybutyl)cyclopentan-1-one (Example 2), 800 ml. of ethanol and 1 g. of p-toluenesulfonic acid monohydrate is heated at reflux for 18 hours. The solvent is evaporated and the residue is dissolved in ether. The ether solution is washed with saline, dilute sodium bicarbonate solution and again with saline, dried over magnesium sulfate and evaporated. The oil is distilled under pressure to give 149 g. of a colorless oil, b.p. 106°–109°C. (0.23 mm).

EXAMPLE 4

Preparation of 2-carboalkoxy(methyl/ethyl)-2-(3-carbethoxypropyl)-cyclopentan-1-one In the manner described in Example 1, treatment of 2-cyclopentanone carboxylate (mixed methyl and ethyl esters) with sodium hydride in dimethoxyethane followed by ethyl 4-iodobutyrate gives a yellow oil, b.p. 136°–137°C. (0.16 mm).

EXAMPLE 5

Preparation of 2-(3-carboxypropyl)cyclopentan-1-one

In the manner described in Example 2, treatment of 2-carboalkoxy(mixed methyl and ethyl esters)-2-(3-carbethoxypropyl)cyclopentan-1-one (Example 4) with a 20% hydrochloric acid and acetic acid mixture gives a yellow oil.

EXAMPLE 6

Preparation of 2-(4-carbethoxypropyl)cyclopentan-1-one

In the manner described in Example 3, treatment of 2-(3-carboxypropyl)cyclopentan-1-one (Example 5) with p-toluenesulfonic acid monohydrate in ethanol gives a colorless oil, b.p. 93°C. (0.10 mm).

EXAMPLE 7

Preparation of ethy and methyl 2-(6-carbethoxyhexyl)-1-cyclopentanon-2-carboxylate In the manner described in Example 1, ethyl and methyl 2-cyclopentanone carboxylate is reacted with ethyl 7-bromoheptanoate to furnate the subject product, b.p. 147°C. (0.09 mm).

EXAMPLE 8

Preparation of 2-(6-carboxyhexyl)cyclopentan-1-one

In the manner described in Example 2, ethyl and methyl 2-(6-carbethoxyhexyl)-1-cyclopentanone-2-carboxylate (Example 7) is hydrolyzed to furnish the subject product, b.p. 143°C. (0.05 mm).

EXAMPLE 9

Preparation of 2-(6-carbethoxyhexyl)cyclopentan-1-one

In the manner described in Example 3, 2-(6-caraboxyhexyl)cyclopentan-1-one (Example 8) is esterified to furnish the subject product, b.p. 110°C. (0.03 mm).

EXAMPLE 10

Preparation of ethyl (methyl) 7-(2-carbethoxycyclohexan-1-on-2-yl)heptanoate

To a stirred suspension of 51 g. sodium hydride (57% in mineral oil) in 675 ml. of dimethylformamide is added 200 g. of 2-cyclohexanone carboxylate (60% ethyl – 40% methyl ester) over a 1–5 hr. period with external cooling to maintain the temperature at 20°–25°C. The reaction mixture is stirred at ambient temperature for 15 minutes and heated to 50°C. over 15 minutes. To the stirred mixture is added 300 g. of ethyl 7-bromoheptanoate during a 10 minute period. The reaction mixture is stirred at 50°–60°C. for 4 hours, cooled, and poured into water. The product is obtained by ether extraction. The extract is washed successively with water and saturated sodium chloride, dried and evaporated to give a liquid which is purified by distillation, IR 1735 cm$^{-1}$ (ester carbonyls) and 1710 cm$^{-1}$ (ketone carbonyl).

EXAMPLE 11

Preparation of 7-(cyclohexan-1-on-2-yl)heptanoic acid

A stirred mixture of 380 g. of mixed methyl and ethyl esters of 7-(2-carbethoxycyclohexan-1-on-2-yl)heptanoate (Example 10), 202 ml. of concentrated sulfuric acid, 970 ml. of glacial acetic acid, and 970 ml. of water is refluxed for 22.5 hours. The cooled reaction mixture is treated with 380 g. of sodium carbonate and 2 liters of water and is extracted with ether. Acidic material is partitioned from the ether extract with 1.0M sodium carbonate. The aqueous phase is acidified with concentrated hydrochloric acid and extracted with ether. The extract is washed successively with water and saturated sodium chloride, dried, and evaporated to give an oil.

EXAMPLE 12

Preparation of ethyl 7-(cyclohexan-1-on-2-yl)heptanoate

A solution of 232 g. of 7-(cyclohexan-1-on-2-yl)heptanoic acid in 2500 ml. of ethanol is refluxed for 4.5 hours with 3.8 g. of p-toluenesulfonic acid monohydrate. The solution is diluted with 200 ml. of benzene, and boiling is continued for 2 hours as 200 ml. of distillate is removed. The volume of the solution is concentrated to 500 ml. After dilution with 500 ml. of ether the solution is extracted with a solution prepared from 50 ml. of saturated sodium bicarbonate, 50 ml. of saturated sodium chloride, and 100 ml. of water. The extract is washed witih saturated sodium chloride, dried, and evaporated. The product is purified by distillation to give a liquid, IR 1740 cm$^{-1}$ (ester carbonyl) and 1715 cm$^{-1}$ (ketone carbonyl).

EXAMPLE 13

Prepration of 2-carboalkoxy(methyl/ethyl)-2-(3-carbethoxypropyl)-cyclohexan-1-one The subject compound is prepared in the manner described in Example 10 by treatment of 2-cyclohexanone carboxylate (mixed methyl and ethyl esters) with sodium hydride and ethyl 4-iodobutyrate.

EXAMPLE 14

Preparation of 2-(3-carbethoxypropyl)cyclohexan-1-one

This compound is prepared from 2-carboalkoxy(methyl/ethyl)-2-(3-carbethoxypropyl)cyclohexan-1-one (Example 13) by decarbalkoxylation according to the procedure described in Example 11 followed by esterification by the procedure of Example 12.

EXAMPLE 15
Preparation of 2-(5-carbethoxypentyl)cyclohexan-1-one

This compound is prepared by alkylation of 2-cyclohexanone carboxylate (mixed methyl and ethyl esters) with ethyl 6-bromohexanoate according to the procedure of Example 10, followed by decarbalkoxylation according to the procedure of Example 11 and finally esterification by the procedure of Example 12.

EXAMPLE 16
Preparation of 2-(7-carbethoxyheptyl)cyclohexan-1-one

Alkylationn of 2-cyclohexanone carboxylate (mixed methyl and ethyl esters) with ethyl 8-bromoctanoate in accordance with the procedure of Example 10, followed by decarbalkoxylation by the procedure of Example 11 and then esterification by the procedure of Example 12 is productive of the subject compound.

EXAMPLE 17
Preparation of 2-carboalkoxy(methyl/ethyl)-2-(carbethoxymethyl)cyclopentan-1-one In the manner described in Example 1, treatment of 2-cyclopentanone carboxylate (mixed methyl and ethyl esters) with sodium hydride in dimethoxyethane followed by ethyl bromoacetate provides a yellow oil, b.p. 130°–131°C. (7 mm).

EXAMPLE 18
Preparation of 2-(carboxymethyl)cyclopentan-1-one

In the manner described in Example 2, the 2-carboalkoxy-2-carboethoxymethylcyclopentanone of Example 17 is decarbalkoxylated to provide 2-carboxymethylcyclopentan-1-one.

EXAMPLE 19
Preparation of 2-carbethoxymethylcyclopentan-1-one

In the manner of Example 3, 2-(carboxymethyl)cyclopentan-1-one (Example 18) is esterified to provide the subject ester.

EXAMPLE 20
Preparation of 1-acetoxy-2-(6-carbethoxyhexyl)cyclopent-1-ene

A stirred solution of 100 g. of 2-(6-carbethoxyhexyl)cyclopentan-1-one (Example 9) in 250 ml. of acetic anhydride containing 0.940 g. of p-toluenesulfonic acid monohydrate is heated to boiling under partial reflux allowing distillate at 118°C. or less (i.e., acetic acid) to escape through a Vigreaux column equipped with a condenser to collect the distillate. After 16 hours, during which period acetic anhydride is added in portions in order to keep the solvent level at least 100 ml., the solution is cooled and poured cautiously into a stirred cold mixture of saturated sodium bicarbonate solution (400 ml.) and hexane (250 ml.). The resulting mixture is stirred for an additional 30 minutes during which period solid sodium bicarbonate is added periodically to insure a basic solution. The hexane layer is separated and washed with saturated sodium chloride solution, dried with anhydrous magnesium sulfate and taken to dryness. Distillation of the residual oil gives 102 g. (87%) of pale yellow oil, b.p. 118°C. (0.07 mm).

EXAMPLE 21
Preparation of 1-acetoxy-2-(carbethoxymethyl)cyclopent-1-ene

In the manner described in Example 20, treatment of 2-(carbethoxymethyl)cyclopentan-1-one (Example 19) with acetic anhydride and p-toluenesulfonic acid monohydrate gives an oil, b.p. 130°–131°C. (7 mm).

EXAMPLE 22
Preparation of 1-acetoxy-2-(3-carbethoxypropyl)cyclopent-1-ene

In the manner described in Example 20, treatment of 2-(3-carbethoxypropyl)cyclopentan-1-one (Example 6) with acetic anhydride and p-toluenesulfonic acid monohydrate gives a yellow oil, b.p. 98°–103°C. (0.35 mm).

EXAMPLE 23
Preparation of 1-acetoxy-2-(4-carbethoxybutyl)cyclopent-1-ene

In the manner described in Example 20, treatment of 2-(4-carbethoxybutyl)cyclopentan-1-one (Example 3) with acetic anhydride and p-toluenesulfonic acid monohydrate gives a yellow oil, b.p. 109°–110°C. (0.37 mm).

EXAMPLE 24
Preparation of ethyl 7-(1-acetoxycyclohex-1-en-2-yl)heptanoate

A stirred solution of 28.0 g. of ethyl 7-(cyclohexan-1-on-2-yl)heptanoate (Example 12), 170 mg. of p-toluenesulfonic acid monohydrate, and 25.6 g. of acetic anhydride is heated for 5 hours while allowing 8.0 g. of distillate to distill. The cooled solution is poured into a stirred, ice-cold mixture of 500 ml. of saturated sodium bicarbonate and 250 ml. of hexane. After 1 hour the hexane phase is separated, dried, and evaporated. The crude product is distilled to give a liquid, IR 1760 cm$^{-1}$ (vinyl ester carbonyl) and 1740 cm$^{-1}$ (ethyl ester carbonyl).

EXAMPLE 25
Preparation of 1-acetoxy-2-(3-carbethoxypropyl)cyclohex-1-ene

Treatment of 2-(3-carbethoxypropyl)cyclohexan-1-one (Example 14) with acetic anhydride by the procedure of Example 24 is productive of the subject compound.

EXAMPLE 26
Preparation of 1-acetoxy-2-(5-carbethoxypentyl)cyclohex-1-ene

Treatment of 2-(5-carbethoxypentyl)cyclohexan-1-one (Example 15) with acetic anhydride by the procedure of Example 24 is productive of the subject compound.

EXAMPLE 27
Preparation of 1-acetoxy-2-(7-carbethoxyheptyl)cyclohex-1-ene

Treatment of 2-(7-carbethoxyheptyl)cyclohexan- 1-one (Example 16) with acetic anhydride by the procedure of Example 24 is productive of the subject compound.

EXAMPLE 28

Preparation of
2-(6-carbethoxyhexyl)cyclopent-2-en-1-one

To a rapidly stirred mixture of 50 g. of 1-acetoxy-2-(6-carbethoxyhexyl)cyclopent-1-ene (Example 20) in 150 ml. of chloroform, 200 ml. of water and 18.8 g. of calcium carbonate, cooled in an ice bath, is added dropwise over a period of about 30 minutes, a solution of 30 g. of bromine in 50 ml. of carbon tetrachloride. After stirring for an additional 45 minutes the chloroform layer is separated and washed successively with dilute sodium thiosulfate solution, saturated sodium chloride solution, dried with anhydrous magnesium sulfate and taken to dryness under reduced pressure.

The residual oil is dissolved in 50 ml. of N,N-dimethylformamide and added to a mixture of 33 g. of lithium bromide and 32 g. of lithium carbonate in 375 ml. of N,N-dimethylformamide, previously dried by refluxing with 375 ml. of benzene under a Dean-Stark apparatus followed by distillation of the benzene. The mixture is stirred at the reflux temperature for 30 minutes, then cooled and poured into 850 ml. of ice-cold. The resulting mixture is acidified (cautiously) with 4N hydrochloric acid and extracted with ether three times. The combined ether extracts are washed with saturated sodium chloride solution, dried with anhydrous magnesium sulfate and taken to dryness under reduced pressure to afford 41.5 g. of an amber oil. In order to convert any isomeric material to the desired product, 41.5 g. of the above material is treated with 0.500 g. of p-toluenesulfonic acid monohydrate in 450 ml. of absolute alcohol at the reflux temperature for 18 hours. The solution is taken to dryness under reduced pressure. The resulting gum is dissolved in ether and washed with saturated sodium bicarbonate solution, saturated sodium chloride solution, dried with anhydrous magnesium sulfate and taken to dryness under reduced pressure. The residual oil is distilled to give 30.2 g. of product; b.p. 118°C. (0.05 mm); $\lambda_{max}$ MeOH 229 m$\mu$ ($\epsilon$9950); $\lambda_{max}$ 5.75, 5.85, 6.15, 8.45 $\mu$; vapor phase chromatography shows 99% product, containing 1% 2-(6-carbethoxyhexyl)cyclopentan-1-one.

This product an be purified by the following procedure. A mixture of 120 g. of 2-(6-carbethoxyhexyl)-2-cyclopentenone, containing approximately 5% of the saturated analogue, and 7.67 g. (10 mole percent) of p-carboxyphenylhydrazine in 400 ml. of absolute ethanol is stirred at ambient temperatures for 18 hours and is then refluxed for 1 hour. The mixture is cooled, the solvent is evaporated, and the residue is taken up into 150 ml. of chloroform and passed through a column of 450 g. of aluminum oxide (Merck). The filtrate is evaporated to yield a colorless oil containing <0.5% of the saturated impurity.

EXAMPLE 29

Preparation of
2-(carbethoxymethyl)cyclopent-2-en-1-one

In the manner described in Example 28, treatment of 1-acetoxy-2-(carbethoxymethyl)cyclopent-1-ene (Example 21) with bromine and subsequent dehydrobromination with lithium bromide-lithium carbonate in N,N-dimethylformamide gives an amber oil. This material is subjected to chromatography on diatomaceous earth using an n-heptane:methyl cellosolve system. Removal of the solvent from hold back volume 4.5–4.7 gives an oil which is then further treated with hydroxylamine hydrochloride, sodium acetate in ethanol at room temperature for 18 hours to give the desired product; b.p. 71°C. (0.12 mm); $\lambda_{max}$ MeOH 222 m$\mu$ (10,300); $\lambda_{max}$ 5.75, 5.85, 6.15, 8.65 $\mu$.

EXAMPLE 30

Preparation of
2-(3-carbethoxypropyl)cyclopent-2-en-1-one

In the manner described in Example 28, bromination of 1-acetoxy-2-(3-carbethoxypropyl)cyclopent-1-ene (Example 22) followed by dehydrobromination with lithium bromide and lithium carbonate is productive of the subject compound.

EXAMPLE 31

Preparation of
2-(4-carbethoxybutyl)cyclopent-2-en-1-one

In the manner described in Example 28, treatment of 1-acetoxy-2-(4-carbethoxybutyl)cyclopentan-1-one (Example 23) with bromine and subsequent treatment of the brominated product with a mixture of lithium bromide and lithium carbonate in N,N-dimethylformamide is productive of the subject compound. Treatment of this product with p-carboxyphenylhydrazine by the procedure of Example 28 furnishes a product which contains less than 0.5% of the corresponding saturated ketone.

EXAMPLE 32

Preparation of ethyl
7-(cyclohex-2-en-1-one-2-yl)heptanoate

To a stirred solution of ethyl 7-(1-acetoxycyclohex-1-en-2-yl)heptanoate (Example 24) in 750 ml. of acetic acid and 125 ml. of pyridine at 10°C. is added a solution of 13.8 g. of bromine in 200 ml. of acetic acid over 20 minutes. The resulting solution is allowed to stand at ambient temperature for 45 minutes and is then decolorized with sodium sulfite. The solution is poured into 800 ml. of half-saturated sodium chloride and extracted with 1:1 hexane-ether. The extract is washed successively with water and saturated sodium chloride, dried over sodium carbonate, and evaporated to give 32 g. of the crude bromoketone. To a stirred suspension of 14.2 g. of lithium bromide and 16.6 g. of lithium carbonate in 250 ml. of anhydrous dimethylformamide at 80°C. is added the above bromoketone. The stirred mixture is heated to boiling over 20 minutes and refluxed for 15 minutes. The cooled mixture is poured into 1000 ml. of water, acidified with dilute hydrochloric acid, and extracted with ether. The extract is washed successively with water and saturated sodium chloride, dried, and evaporated. The product is purified by distillation to give a liquid, IR 1740 cm$^{-1}$ (ester carbonyl), 1685 cm$^{-1}$ (ketone carbonyl), and 1650 cm$^{-1}$ (olefin); NMR (CCl$_4$) 6.63 (multiplet, vinyl proton).

EXAMPLE 33

Preparation of
2-(3-carbethoxypropyl)cyclohex-2-en-1-one

In accordance with the procedure of Example 32, bromination of 1-acetoxy-2-(3-carbethoxypropyl)cyclohex-1-ene (Example 25) followed by treatment with lithium bromide and lithium carbonate is productive of the subject compound.

EXAMPLE 34

Preparation of 2-(5-carbethoxypentyl)cyclohex-2-en-1-one

By the procedure of Example 32, bromination of 1-acetoxy-2-(5-carbethoxypentyl)cyclohex-1-ene (Example 26) followed by treatment with lithium bromide and lithium carbonate is productive of the subject compound.

EXAMPLE 35

Preparation of 2-(7-carbethoxyheptyl)cyclohex-1-en-2-one

By the procedure of Example 32, bromination of 1-acetoxy-2-(7-carbethoxyheptyl)cyclohexan-1-one (Example 27) followed by treatment with lithium bromide and lithium carbonate is productive of the subject compound.

EXAMPLE 36

Preparation of ethyl 9-oxo-13-trans-prostenoate

A solution of 1.102 g. of 1-octyne in 2 ml. of benzene is treated with 11.5 ml. of 15% diisobutylaluminum hydride in toluene and the solution is heated to 50°C. for 2 hours. The solution is cooled, its solvent is removed in vacuo, and the resulting oil is treated with 5.45 ml. of 5.10% methyl lithium in diethyl ether with ice cooling. To the resulting solution is added 1.830 g. of 2-(6-carbethoxyhexyl)-2-cyclopentenone (Example 28) and the solution is stirred at ambient temperatures for 18 hours. The solution is poured onto ice and dilute hydrochloric acid, and the mixture is extracted with diethyl ether. The organic phase is washed with dilute sodium bicarbonate, water, and saturated brine, dried, and evaporated. The residue is purified by chromatography on Florisil and distillation to yield 1.878 g. of an oil, IR 1736 $cm^{-1}$ (ester and ketone carbonyls) 969 $cm^{-1}$ (trans vinyl group); NMR ($CDCl_3$) δ 5.14–5.87 (multiplet, 2H, vinyl protons, J trans=15 Hz); Mass Spectrum, parent peak at 350 mµ.

EXAMPLE 37

Preparation of ethyl 20-butyl-9-oxo-13-trans-prostenoate

In the manner described in Example 36, 2-(6-carbethoxyhexyl)-2-cyclopentenone (Example 28) is added to the reagent prepared from 1-dodecyne, diisobutylaluminum hydride, and methyl lithium. The crude product obtained by acid hydrolysis and ether extraction is purified by silica gel chromatography to give an oil, IR 1740 $cm^{-1}$ (ester and ketone carbonyls) 967 $cm^{-1}$ (trans vinyl group).

EXAMPLE 38

Preparation of ethyl 9-oxo-18,19,20-trinor-13-trans-prostenoate

In the manner described in Example 36, 2-(6-carbethoxyhexyl)-2-cyclopentenone (Example 28) is added to the reagent prepared from 1-pentyne, diisobutylaluminum hydride, and methyl lithium. The crude product obtained by acid hydrolysis and ether extraction is purified by distillation to give a liquid, IR 1740 $cm^{-1}$ (ester and ketone carbonyls) 967 $cm^{-1}$ (trans vinyl group).

EXAMPLE 39

Preparation of ethyl 15-methyl-9-oxo-17,18,19,20-tetranor-13-trans-prostenoate

In the manner described in Example 36, 2-(6-carbethoxyhexyl)-2-cyclopentenone (Example 28) is added to the reagent prepared from 3-methyl-1-butyne, diisobutylaluminum hydride, and methyl lithium. The crude product obtained by acid hydrolysis and ether extraction is purified by distillation to give a liquid, IR 1740 $cm^{-1}$ (ester and ketone carbonyls) 967 $cm^{-1}$ (trans vinyl group).

EXAMPLE 40

Preparation of ethyl 9-oxo-20-nor-13-trans-prostenoate

A solution of 5.30 g. of 1-heptyne in 10 ml. of benzene is treated with 40 ml. of 1.2N diisobutylaluminum hydride in hexane and heated at 50°C. for 2 hours. The solution is cooled in an ice bath and diluted with 25 ml. of ether. To the solution is added 30 ml. of 1.6M n-butyl lithium in hexane. After stirring for 20 minutes at 15°–25°C. the resulting solution is treated with a solution of 2-(6-carbethoxyhexyl)-2-cyclopentenone (Example 28). The mixture is stirred at 5°–25°C. for 18-20 hours and the product then is hydrolyzed with a mixture of ice and hydrochloric acid. The crude product, obtained from the organic phase, is purified by chromatography on silica gel to give an oil, IR 1740 $cm^{-1}$ (ester and ketone carbonyls) and 967 $cm^{-1}$ (trans vinyl group).

EXAMPLE 41

Preparation of ethyl 20-methyl-9-oxo-13-trans-prostenoate

In the manner described in Example 40, 2-(6-carbethoxyhexyl)-2-cyclopentenone (Example 28) is added to the reagent prepared from 1-nonyne, diisobutylaluminum hydride and n-butyl lithium. The crude product obtained by acid hydrolysis and evaporation of organic solvent is purified by chromatography on silica gel to give an oil, IR 1740 $cm^{-1}$ (ester and ketone carbonyls) and 967 $cm^{-1}$ (trans vinyl group).

EXAMPLE 42

Preparation of ethyl 17-methyl-9-oxo-19,20-dinor-13-trans-prostenoate

In the manner described in Example 40, 2-(6-carbethoxyhexyl)-2-cyclopentenone (Example 28) is added to the reagent prepared from 5-methyl-1-hexyne, diisobutylaluminum hydride and n-butyl lithium. The crude product obtained by acid hydrolysis and evaporation of the organic solvent is purified by chromatography on silica gel to give an oil, IR 1740 $cm^{-1}$ (ester and ketone carbonyls) and 967 $cm^{-1}$ (trans vinyl group).

EXAMPLE 43

Preparation of ethyl 9-oxo-6,7-dinor-13-trans-prostenoate

In the manner described in Example 36, 2-(4- carbethoxybutyl)-2-cyclopentenone (Example 31) is added to the reagent prepared from 1-octyne, diisobutylaluminum hydride, and methyl lithium. The product is obtained by acid hydrolysis, ether extraction and distillation to yield a colorless oil, b.p. 149°–150°C. (0.075 mm). IR 1740 cm$^{-1}$ (ester and ketone carbonyl) 963 cm$^{-1}$ (trans-vinyl group).

EXAMPLE 44

Preparation of ethyl 9-oxo-6,7,20-trinor-13-trans-prostenoate

In the manner described in Example 36, 2-(6-carbethoxyhexyl)-2-cyclopentenone (Example 31) is added to the reagent prepared from 1-heptyne, diisobutylaluminum hydride and methyl lithium. The crude product obtained by acid hydrolysis and ether extraction is purified by silica gel chromatography to give an oil, IR 1740 cm$^{-1}$ (ester and ketone carbonyls) 967 cm$^{-1}$ (trans vinyl group).

EXAMPLE 45

Preparation of ethyl 17-methyl-9-oxo-6,7,19,20-tetranor-13-trans-prostenoate

In the manner described in Example 40, 2-(4-carbethoxybutyl)-2-cyclopentenone (Example 31) is added to the reagent prepared from 5-methyl-1-hexyne, diisobutylaluminum hydride and n-butyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans vinyl group).

EXAMPLE 46

Preparation of ethyl 9-oxo-3,4,5,6,7-pentanor-13-trans-prostenoate

In the manner described in Example 36, 2-(carbethoxymethyl)-2-cyclopentenone (Example 29) is added to the reagent prepared from 1-octyne, diisobutylaluminum hydride and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans vinyl group).

EXAMPLE 47

Preparation of ethyl 9-oxo-5,6,7-trinor-13-trans-prostenoate

In the manner described in Example 36, 2-(3-carbethoxypropyl)-2-cyclopentenone (Example 30) is added to the reagent prepared from 1-octyne, diisobutylaluminum hydride and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans vinyl group).

EXAMPLE 48

Preparation of ethyl 9-oxo-20-propyl-5,6,7-trinor-13-trans-prostenoate

In the manner described in Example 36, 2-(3-carbethoxypropyl)-2-cyclopentenone (Example 30) is added to the reagent prepared from 1-undecyne, diisobutylaluminum hydride and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans vinyl group).

EXAMPLE 49

Preparation of ethyl 9-oxo-5,6,7,18,19,20-hexanor-13-trans-prostenoate

In the manner described in Example 36, 2-(3-carbethoxypropyl)-2-cyclopentenone (Example 30) is added to the reagent prepared from 1-pentyne, diisobutylaluminum hydride and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans vinyl group).

EXAMPLE 50

Preparation of ethyl 9-oxo-10a-homo-13-trans-prostenoate

In the manner described in Example 40, 2-(6-carbethoxyhexyl)-2-cyclohexenone (Example 32) is added to the reagent prepared from 1-octyne, diisobutylaluminum hydride and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans vinyl group).

EXAMPLE 51

Preparation of ethyl 20-butyl-9-oxo-10a-homo-13-trans-prostenoate

In the manner described in Example 40, 2-(6-carbethoxyhexyl)-2-cyclohexenone (Example 32) is added to the reagent prepared from 1-dodecyne, diisobutylaluminum hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans vinyl group).

EXAMPLE 52

Preparation of ethyl 9-oxo-18,19,20-trinor-10a-homo-13-trans-prostenoate

In the manner described in Example 40, 2-(6-carbethoxyhexyl)-2-cyclohexenone (Example 32) is added to the reagent prepared from 1-pentyne, diisobutylaluminum hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans vinyl group).

EXAMPLES 53 – 60

The 10a-homo-prostenoate derivatives of Table III below are obtained in the manner described in Example 40 by addition of the indicated 2-(ω-carbethoxyalkyl)-2-cyclohexenone to the reagent prepared from the appropriate 1-alkyne (listed in the Table), diisobutylaluminum hydride, and n-butyl lithium. The crude products, obtained as oils by acid hydrolysis and evaporation of the organic solvent, are purified by chromatography on silica gel and distillation; IR 1740 cm⁻¹ (ester carbonyl), 1750 cm⁻¹ (ketone carbonyl), and 967 cm⁻¹ (trans vinyl group).

TABLE III

| Ex. | Cyclohexenone | 1-Alkyne | Product |
|---|---|---|---|
| 53 | 2-(3-carbethoxypropyl)-2-cyclohexenone (Example 33) | 1-octyne | ethyl 9-oxo-5,6,7-trinor-10a-homo-13-trans-prostenoate |
| 54 | 2-(3-carbethoxypropyl)-2-cyclohexenone (Example 33) | 1-heptyne | ethyl 9-oxo-5,6,7,20-tetranor-10a-homo-13-trans-prostenoate |
| 55 | 2-(3-carbethoxypropyl)-2-cyclohexenone (Example 33) | 3-methyl-1-butyne | ethyl 15-methyl-9-oxo-5,6,7,17,18,19,20-heptanor-10a-homo-13-trans-prostenoate |
| 56 | 2-(5-carbethoxypentyl)-2-cyclohexenone (Example 34) | 1-octyne | ethyl 9-oxo-6,7-dinor-10a-homo-13-trans-prostenoate |
| 57 | 2-(5-carbethoxypentyl)-2-cyclohexenone (Example 34) | 1-undecyne | ethyl 9-oxo-20-propyl-6,7-dinor-10a-homo-13-trans-prostenoate |
| 58 | 2-(5-carbethoxypentyl)-2-cyclohexenone (Example 34) | 5-methyl-1-hexyne | ethyl 17-methyl-9-oxo-6,7,19,20-tetranor-10a-homo-13-trans-prostenoate |
| 59 | 2-(7-carbethoxyheptyl)-2-cyclohexenone (Example 35) | 1-octyne | ethyl 9-oxo-7a,10a-bishomo-13-trans-prostenoate |
| 60 | 2-(7-carbethoxyheptyl)-2-cyclohexenone (Example 35) | 1-hexyne | ethyl 9-oxo-19,20-dinor-7a,10a-bishomo-13-trans-prostenoate |

EXAMPLE 61

Preparation of 20-butyl-9-oxo-13-trans-prostenoic acid

A solution of 2.33 g. of ethyl 20-butyl-9-oxo-13-trans-prostenoate (Example 37) and 1.30 g. of potassium hydroxide in 35 ml. of methanol and 3.5 ml. of water is allowed to stand at room temperature for 24 hours. The reaction mixture is concentrated in vacuo, diluted with water, and washed with ether. The aqueous phase is acidified to pH 2 and extracted with ether. The extract is washed with saturated sodium chloride, dried, and evaporated to give an oil, IR 1745 cm⁻¹ (ketone carbonyl), 1710 cm⁻¹ (acid carbonyl), and 967 cm⁻¹ (trans vinyl group).

EXAMPLE 62

Preparation of 9-oxo-13-trans-prostenoic acid

A mixture of 0.140 g. of ethyl 9-oxo-13-trans-prostenoate (Example 36) and 0.072 g. of potassium hydroxide in 6 ml. of 1:1 aqueous methanol is stirred at ambient temperatures for 17 hours. The resulting solution is acidified with hydrochloric acid, extracted with diethyl ether, and the organic phase is washed with water and saturated brine, dried, and the solvent removed to yield 0.128 g. of an oil, IR 1739 cm⁻¹ (ketone carbonyl) 1706 cm⁻¹ (acid carbonyl), 969 cm⁻¹ (trans vinyl group); NMR (CDCl₃) 5.34–5.67 (multiplet, 2H, vinyl protons, J trans=15 Hz), 10.47 (broad singlet, 1H, carboxyl proton, exchangeable); Mass spectrum, parent peak at 322 mμ.

EXAMPLE 63

Preparation of 9-oxo-6,7-dinor-13-trans-prostenoic acid

In the manner described in Example 62, ethyl 9-oxo-6,7-dinor-13-trans-prostenoate (Example 43) is saponified with potassium hydroxide, acidified, and worked-up by ether extraction and evaporative distillation at 160°C. (0.005 mm) to yield a colorless oil.

EXAMPLES 64 – 85

In the manner described in Example 61, the carboxylic acids of Table IV (below) are prepared by saponification of the corresponding ethyl esters at room temperature in methanol-water followed by acidification and extraction with ether. Infrared characterization of the cyclopentanone derivatives gives bands at about 1745 cm⁻¹ (ketone carbonyl), 1710 cm⁻¹ (acid carbonyl) and 967 cm⁻¹ (trans vinyl group). The cyclohexanone derivatives also show the 967 cm⁻¹ band, but the carboxylic acid and ketone carbonyl functions give bands occurring at about 1715 cm⁻¹.

TABLE IV

| Ex. | Starting Ester of | |
|---|---|---|
| 64 | Example 38 | 9-oxo-18,19,20-trinor-13-trans-prostenoic acid |
| 65 | Example 39 | 15-methyl-9-oxo-17,18,19,20-tetranor-13-trans-prostenoic acid |
| 66 | Example 40 | 9-oxo-20-nor-13-trans-prostenoic acid |
| 67 | Example 41 | 20-methyl-9-oxo-13-trans-prostenoic acid |
| 68 | Example 42 | 17-methyl-9-oxo-19,20-dinor-13-trans-prostenoic acid |
| 69 | Example 44 | 9-oxo-6,7,20-trinor-13-trans-prostenoic acid |
| 70 | Example 45 | 17-methyl-9-oxo-6,7,19,20-tetranor-13-trans-prostenoic acid |
| 71 | Example 46 | 9-oxo-3,4,5,6,7-pentanor-13-trans-prostenoic acid |
| 72 | Example 47 | 9-oxo-5,6,7-trinor-13-trans-prostenoic acid |
| 73 | Example 48 | 9-oxo-20-propyl-5,6,7-trinor-13-trans-prostenoic acid |
| 74 | Example 49 | 9-oxo-5,6,7,18,19,20-hexanor-13-trans-prostenoic acid |
| 75 | Example 50 | 9-oxo-10a-homo-13-trans-prostenoic acid |
| 76 | Example 51 | 20-butyl-9-oxo-10a-homo-13-trans-prostenoic acid |
| 77 | Example 52 | 9-oxo-18,19,20-trinor-10a-homo-13-trans-prostenoic acid |
| 78 | Example 53 | 9-oxo-5,6,7-trinor-10a-homo-13-trans-prostenoic acid |
| 79 | Example 54 | 9-oxo-5,6,7,20-tetranor-10a-homo-13-trans-prostenoic acid |
| 80 | Example 55 | 15-methyl-9-oxo-5,6,7,17,18,19,20-heptanor-10a-homo-13-trans-prostenoic acid |
| 81 | Example 56 | 9-oxo-6,7-dinor-10a-homo-13-trans-prostenoic acid |
| 82 | Example 57 | 9-oxo-20-propyl-6,7-dinor-10a-homo-13-trans-prostenoic acid |
| 83 | Example 58 | 17-methyl-9-oxo-6,7,19,20-tetranor-10a-homo-13-trans-prostenoic acid |
| 84 | Example 59 | 9-oxo-7a,10a-bishomo-13-trans-prostenoic acid |
| 85 | Example 60 | 9-oxo-19,20-dinor-7a,10a-bishomo-13-trans-prostenoic acid |

We claim:
1. Compounds of the formula:

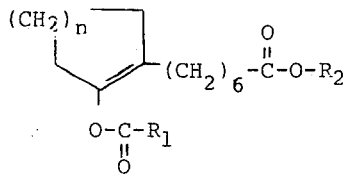

wherein $n$ is the integer 1 or 2, $R_1$ is alkyl having up to 4 carbon atoms, and $R_2$ is alkyl having up to 4 carbon atoms.

2. The compound according to claim 1 wherein $n$ is 1, $R_1$ is methyl, and $R_2$ is ethyl; 1-acetoxy-2-(6-carbethoxyhexyl)cyclopent-1-ene.

3. The compound according to claim 1 wherein $n$ is 2, $R_1$ is methyl, and $R_2$ is ethyl; 1-acetoxy-2-(6-carbethoxyhexyl)cyclohex-1-ene.

* * * * *